Figure 1:
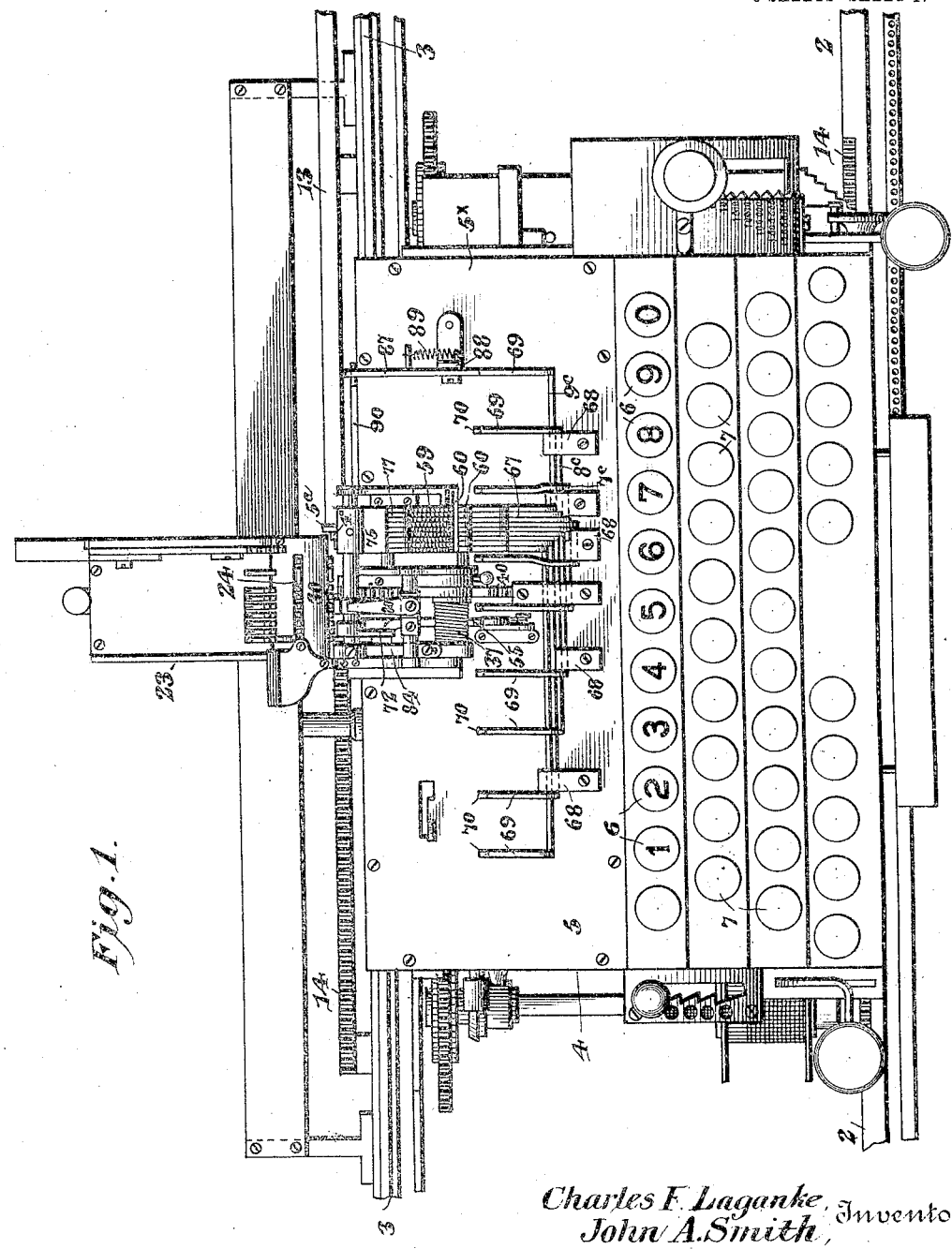

No. 820,880. PATENTED MAY 15, 1906.
C. F. LAGANKE & J. A. SMITH.
CALCULATING MACHINE.
APPLICATION FILED JAN. 26, 1905.

9 SHEETS—SHEET 1.

Witnesses
Jas. F. McCathran
Louis G. Julihn

Charles F. Laganke, Inventors
John A. Smith,
By C. G. Siggers
Attorney

No. 820,880. PATENTED MAY 15, 1906.
C. F. LAGANKE & J. A. SMITH.
CALCULATING MACHINE.
APPLICATION FILED JAN. 26, 1905.
9 SHEETS—SHEET 2.
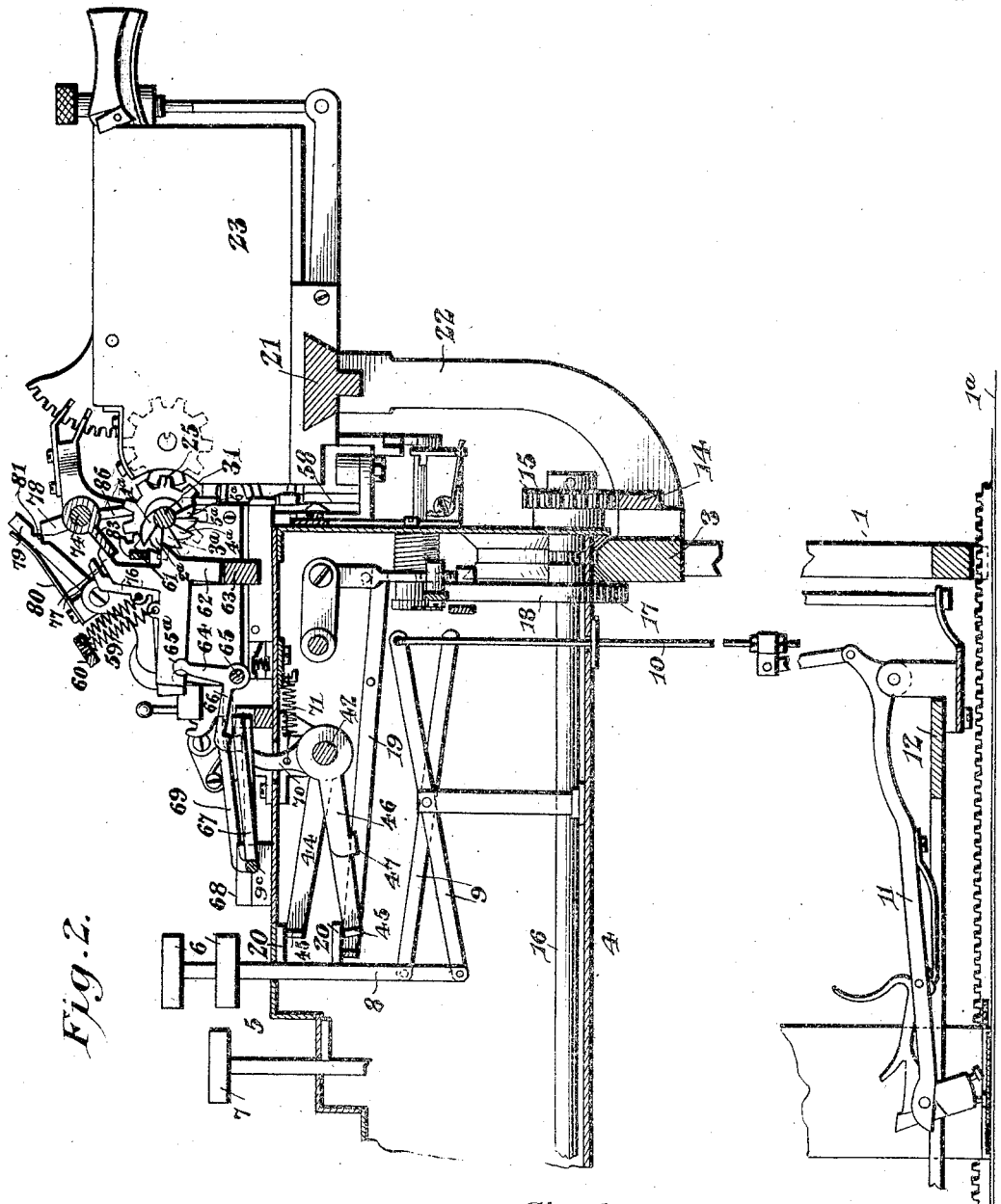

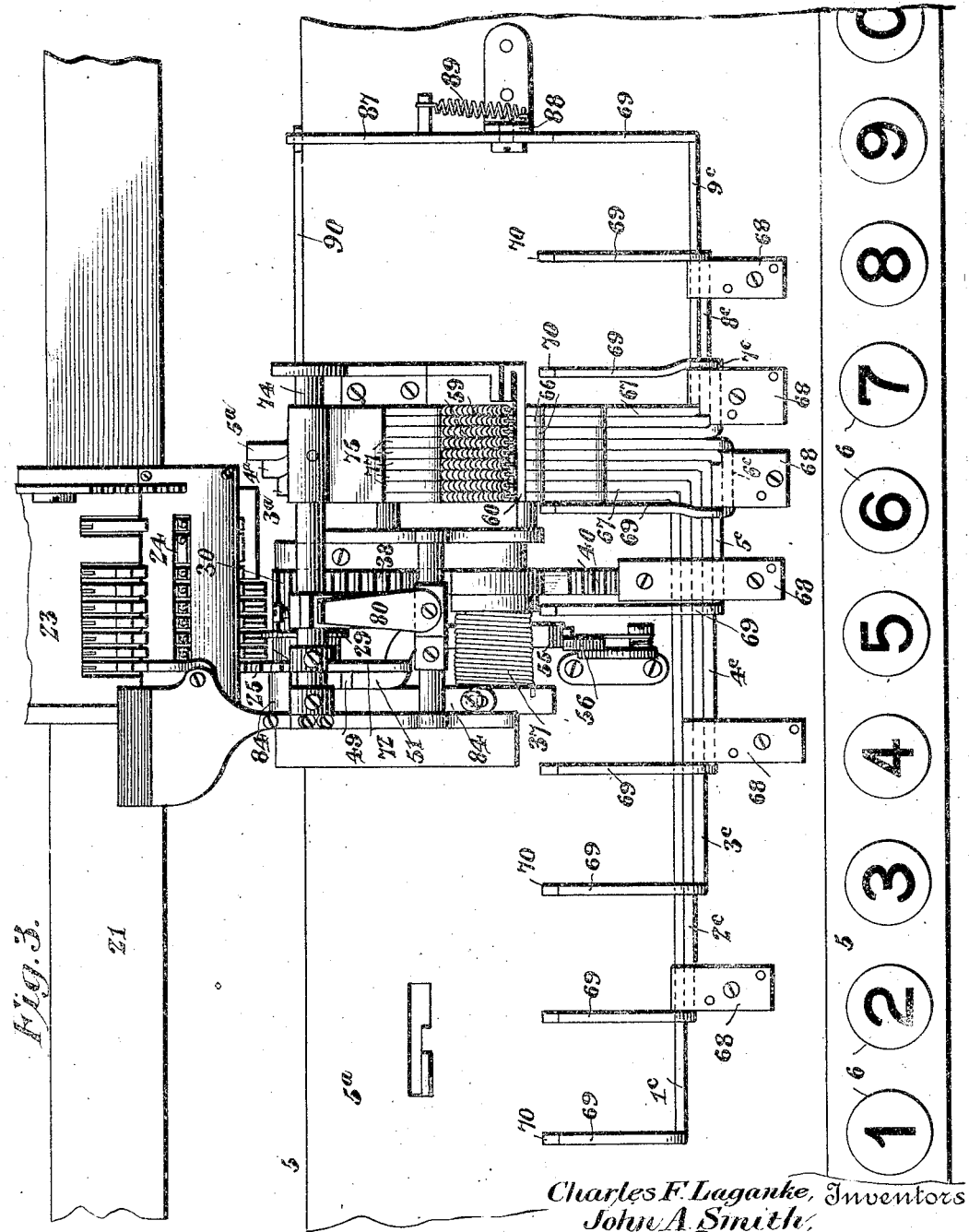

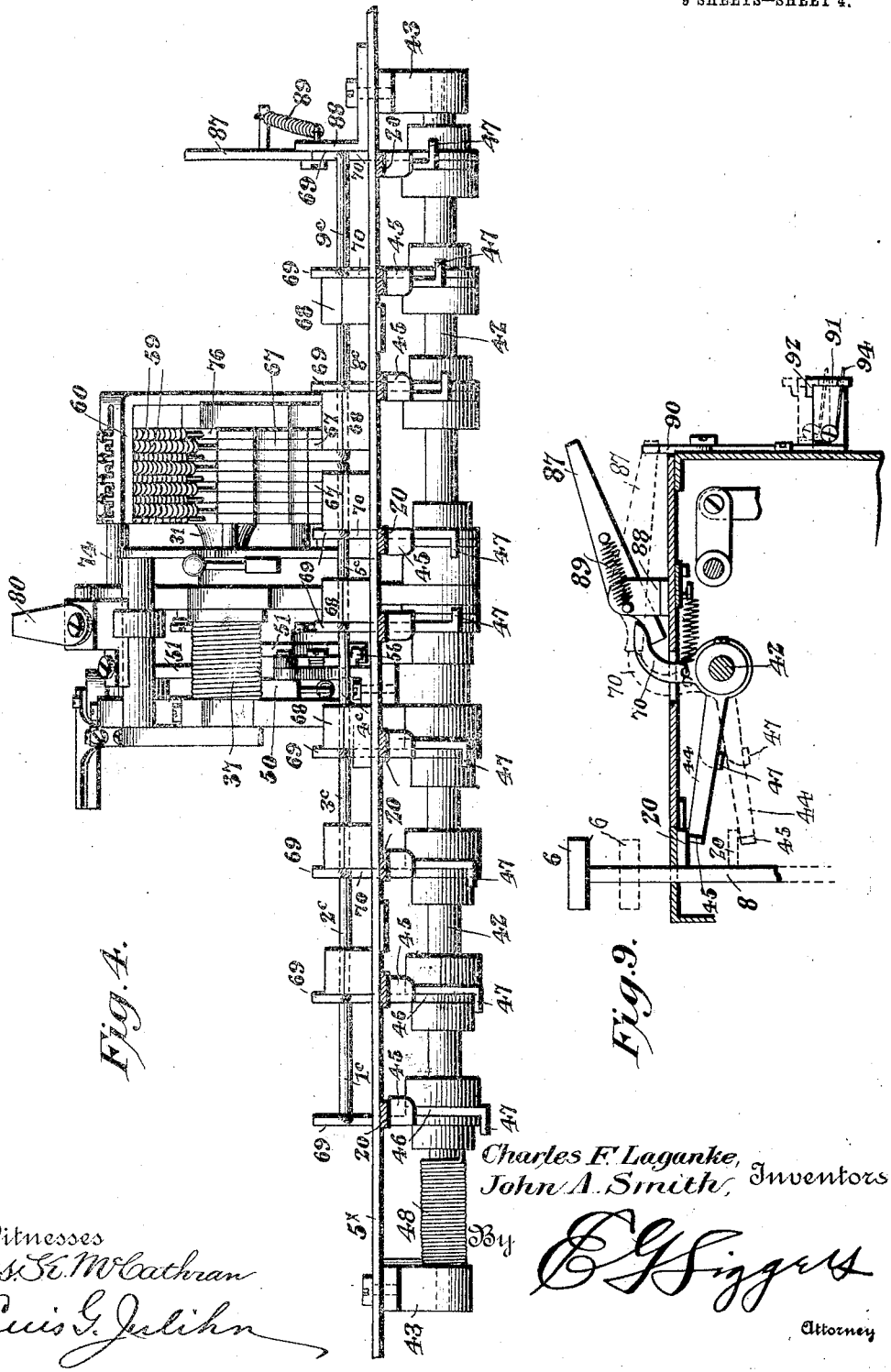

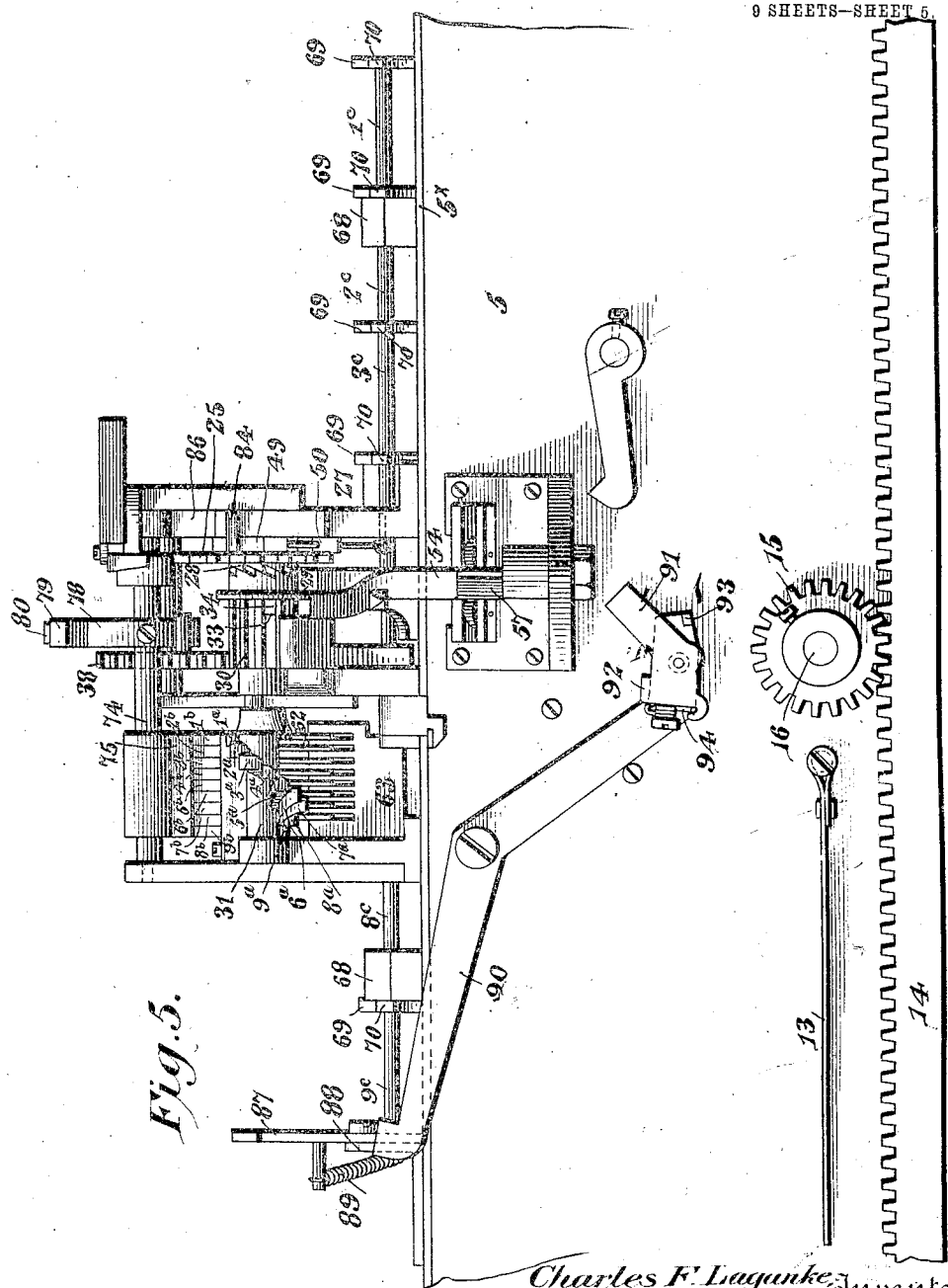

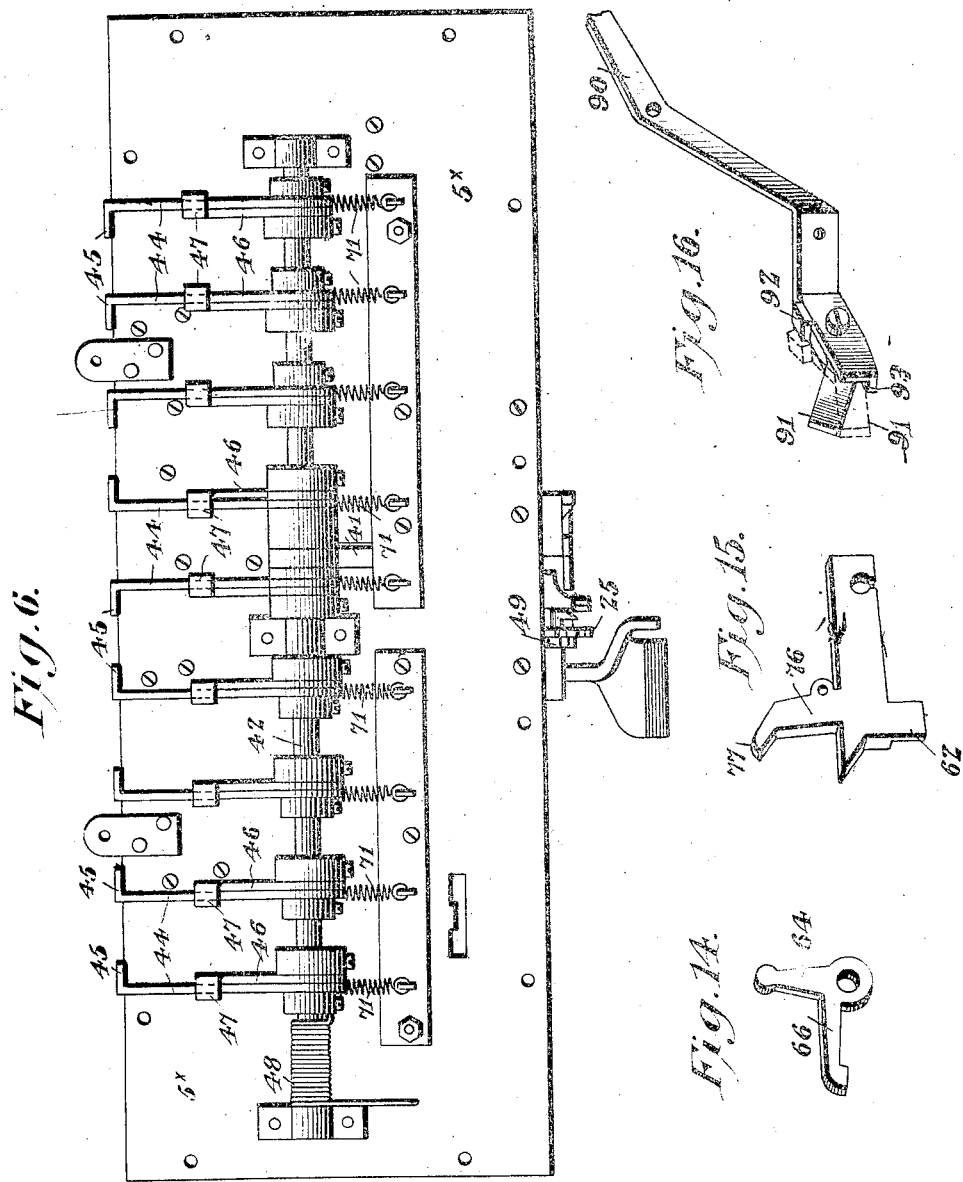

No. 820,880. PATENTED MAY 15, 1906.
C. F. LAGANKE & J. A. SMITH.
CALCULATING MACHINE.
APPLICATION FILED JAN. 26, 1905.
9 SHEETS—SHEET 7.
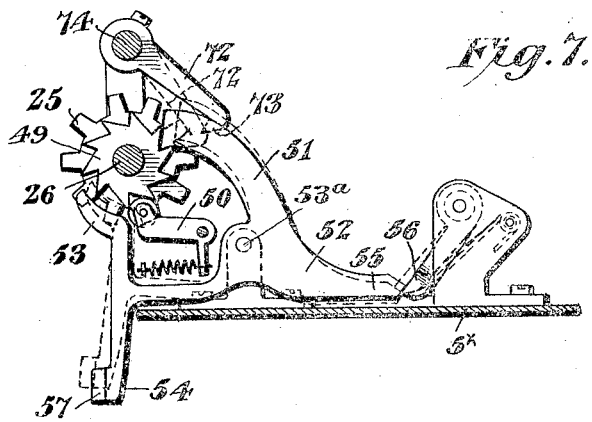
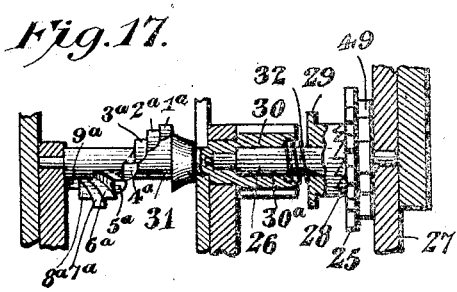
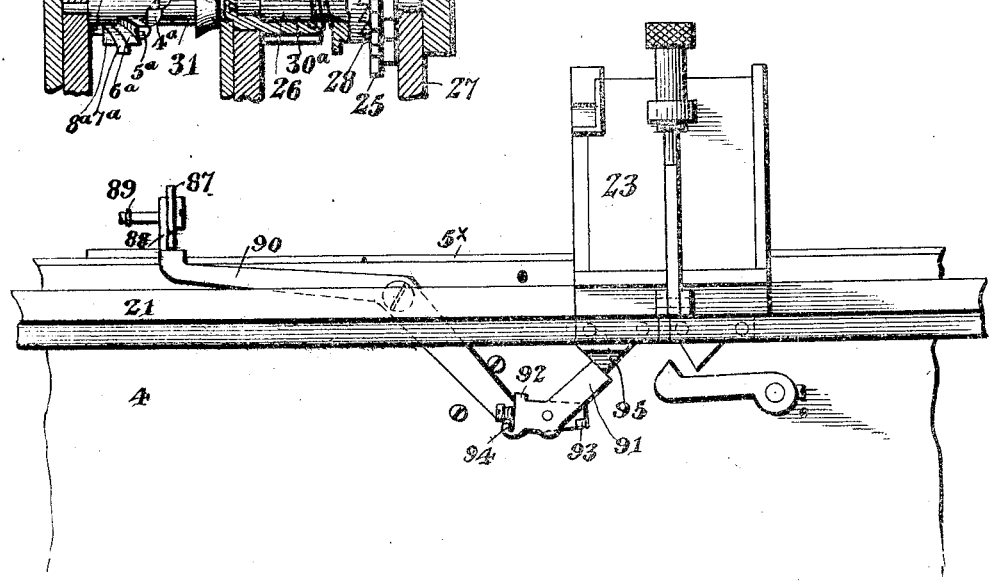
Charles F. Laganke,
John A. Smith, Inventors
Witnesses No. 820,880. PATENTED MAY 15, 1906.
C. F. LAGANKE & J. A. SMITH.
CALCULATING MACHINE.
APPLICATION FILED JAN. 26, 1905.

9 SHEETS—SHEET 8.

Witnesses
Jas. K. McCathran
Louis G. Julihn

Charles F. Laganke,
John A. Smith, Inventors

By C. G. Siggers
Attorney

UNITED STATES PATENT OFFICE.

CHARLES FREDERICK LAGANKE AND JOHN ASBURY SMITH, OF CLEVELAND, OHIO, ASSIGNORS TO ELLIOTT-FISHER COMPANY, OF NEW YORK, N. Y., A CORPORATION OF DELAWARE.

CALCULATING-MACHINE.

No. 820,880.

Specification of Letters Patent.

Patented May 15, 1906.

Application filed January 26, 1905. Serial No. 242,720.

*To all whom it may concern:*

Be it known that we, CHARLES FREDERICK LAGANKE and JOHN ASBURY SMITH, both citizens of the United States, residing at Cleveland, in the county of Cuyahoga and State of Ohio, have invented a new and useful Calculating-Machine, of which the following is a specification.

This invention relates to a calculating-machine, and more particularly to one of that type in which the numbers included in the computation are recorded by a typewriting mechanism, the numeral-keys of which operate the computing device as well as the recording devices.

Considered in a somewhat more specific aspect, the invention relates to an improved form of operating mechanism for transmitting motion from the numeral-keys to the computing device, the invention being especially directed to the provision of means whereby each key when operated will with certainty effect a proper movement of the operating mechanism corresponding in extent or degree to the numerical value of the particular key depressed.

Subordinate to this general object, the several specific objects of the invention may be stated, as follows:

First. To prevent overrunning of the master-wheel. This end is attained by providing a series of spirally-arranged stops movable with the master-wheel as the latter is operated by a key and arranged to coöperate with another series of stops, one of which is advanced by the key into the path of the appropriate stop of the spirally-arranged series, so that as the master-wheel reaches the limit of its proper movement it will be arrested with certainty and precision.

Second. To supplement the stop mechanism by providing a check-arm operated by the stop mechanism to engage and check the master-wheel at the proper time. This end is attained by mounting the check-arm on a check-shaft equipped with a lateral arm or plate arranged to be struck by any of the key-set stops to rock the shaft, and thus throw the check-arm to its operative position.

Third. To provide improved means for preventing excessive movement of a wheel which is carried or advanced by the wheel being operated. This end is attained by providing a slide having operative connection with the check-shaft and arranged to be projected into engagement with a wheel of the computing device simultaneously with the movement of the check-arm into engagement with the master-wheel.

Fourth. To provide means whereby the numeral-keys and recording mechanism may be disconnected from the computing device in order that digits may be printed—as, for instance, in setting down the total of a computation without effecting the operation of the computing device. This end is attained by providing in an accessible position a total key or lever which when depressed will move certain elements of the operating connections to inoperative positions.

Fifth. To provide automatic means for restoring the operative connection between the numeral-keys and the computing device after the total has been printed. This end is attained by providing a total-key-retracting mechanism arranged to be operated by a trip as the recording mechanism is drawn back or retracted preparatory to the printing of a new line of characters.

Various other objects of the invention and additional structural features will be pointed out and described as the succeeding description is developed, and the invention in its various aspects will be succinctly defined in the appended claims.

Figure 10:
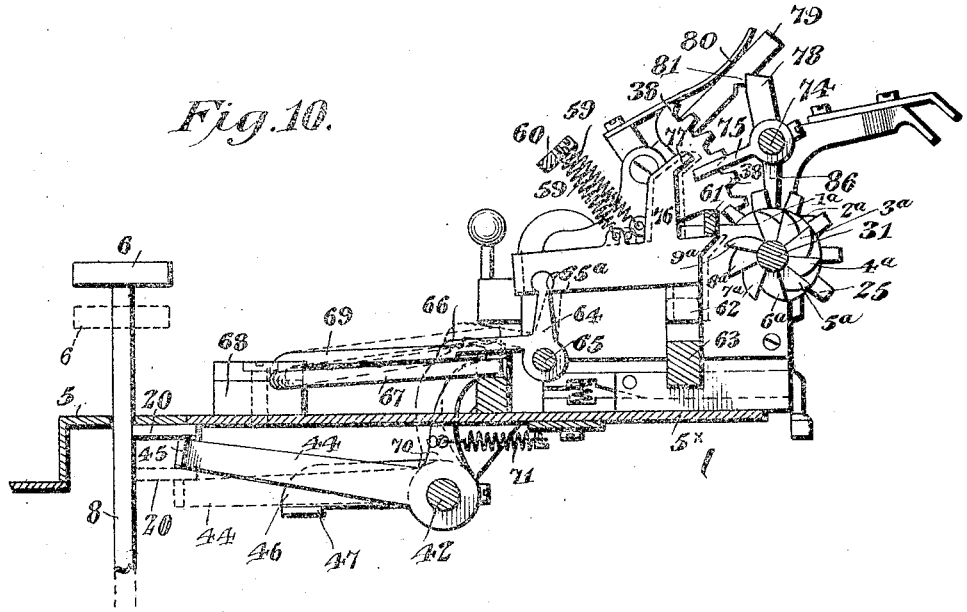
Figure 11:
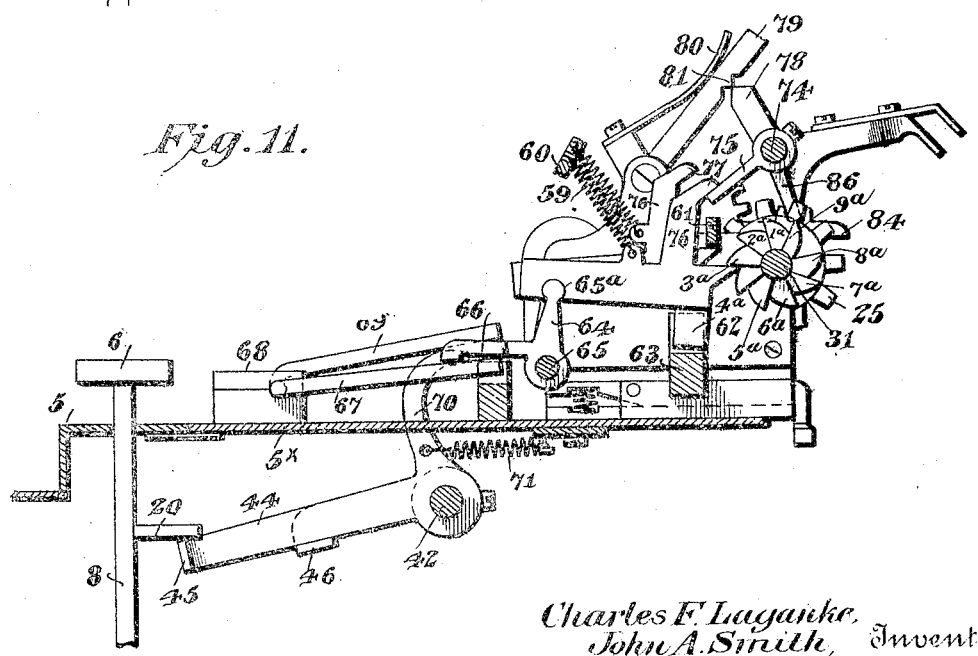
Figure 12:
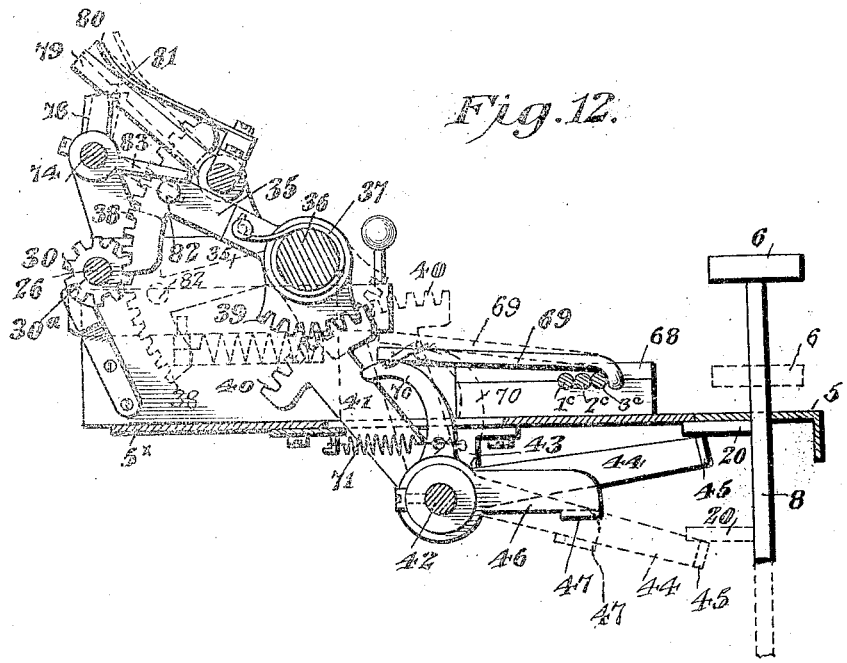
Figure 13:
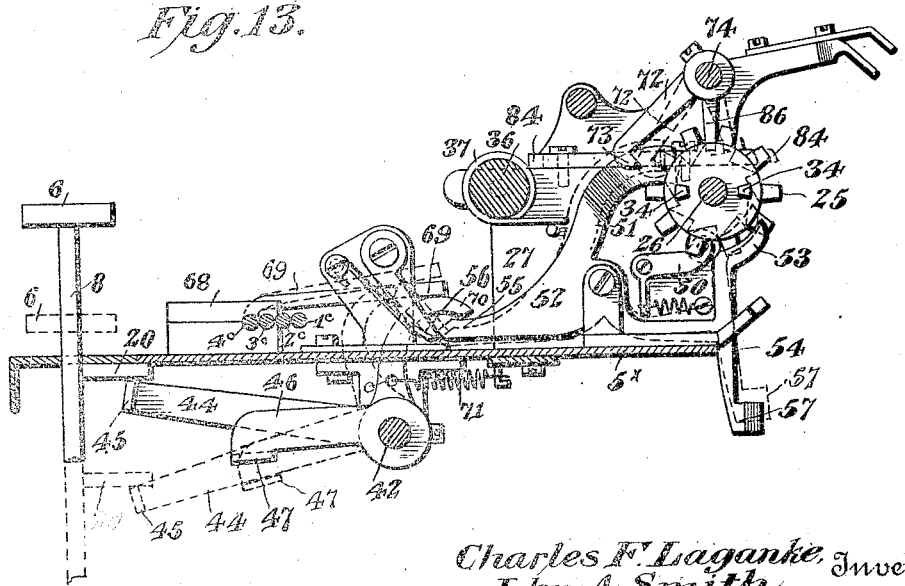

In the accompanying drawings, Figure 1 is a plan view of a portion of an Elliott-Fisher type-writer equipped in accordance with the invention. Fig. 2 is a vertical section of the same subject-matter. Fig. 3 is a plan view on a somewhat enlarged scale and designed more particularly to show the specific structure wherein the invention resides. Fig. 4 is a front elevation of the entire mechanism, which is assembled on the cover-plate of the carriage. Fig. 5 is a rear elevation of the machine with the computing device and its support omitted. Fig. 6 is a bottom plan view of the cover-plate, showing the various parts assembled on the under side thereof. Fig. 7 is a detailed elevation showing the master-wheel and associated parts, including the check-arm, the means for preventing reverse rotation of the wheel, and the means whereby the connections are released to permit their retraction. Fig. 8 is a detail view showing the manner in which the total-key-retracting lever is operated by coming in contact with a trip as the carriage is retracted. Fig. 9 is a detail sectional elevation designed more particularly to show the manner in which the total key or lever is operated to effect the disconnection of the keys and recording mechanism from the computing device, the positions assumed by the parts when the disconnection has been effected being indicated in dotted lines. Fig. 10 is a sectional elevation showing the relation of the key-set stops to the spirally-arranged series of coöperating stops. Fig. 11 is a similar view showing the key depressed and the various parts in the positions they assume when one of the key-set stops, having been moved to its operative position by the key, arrests the actuator-shaft by engagement with one of the stops of the spirally-arranged series. Fig. 12 is a sectional elevation showing one complete connection—that is to say, that group of elements which serves to operatively connect one of the numeral-keys with the actuator-shaft. Fig. 13 is a sectional view designed more especially to show the relation of the check-arm to the master-wheel. Fig. 14 is a detail view of one of the stop-shifting levers. Fig. 15 is a detail view of one of the stops. Fig. 16 is a detail view of the total-key-retracting lever, and Fig. 17 is a section through the actuator-shaft and associated parts.

Each part or structural feature is designated by its appropriate reference character throughout the views.

The subject-matter of this invention is primarily a calculating-machine, since the novelty resides more particularly in the mechanism for operating and controlling the primary elements—as, for instance, number-wheels—of a computing device. The illustrated embodiment of the invention, however, has been devised with special reference to its employment in a combined calculating and recording machine of that type in which a computing device is disposed for operation by the numeral-keys of a type-writer, said keys serving both to operate the computing or calculating mechanism and to cause the printing of the digits included in the computation. For the purpose of this disclosure we have selected a type-writing machine of that class which are known as "flat-platen" or "book" type-writers, the particular machine illustrated being what is known commercially as the "Elliott-Fisher" type-writer, exemplified in Patent No. 537,868 to R. J. Fisher, to which reference is made for a more complete disclosure of the recording mechanism than is thought to be necessary in the present connection.

*The general organization of the type-writer.*—The type-writer here shown embodies a machine-frame 1, mounted to travel longitudinally of a flat platen 1ª to space the lines of writing. The frame 1 includes front and rear carriage-guides 2 and 3, which slidably support a carriage 4, carrying the printing mechanism and movable transversely of the platen to letter-space the writing. The upper portion of the carriage 4 is in the form of a casing 5, above which are spaced the numeral and letter keys 6 and 7, having stems 8, connected at their lower ends to key-levers 9, fulcrumed within the carriage-casing 5. The key-levers 9 are connected through draw-wires 10 with downwardly-swinging type-bars 11, carried by a type-ring 12, pendent from the carriage-casing. (See Fig. 2.) The carriage 4 is moved to the right by carriage-propelling mechanism including tapes 13, connected at their inner ends to the carriage and at their outer ends to spring-drums (not shown) mounted on the machine-frame.

The step-by-step advance of the carriage in the direction of letter-spacing is controlled by carriage-feeding mechanism, including racks 14, associated with the carriage-guides 2 and 3 and meshing with pinions 15, fixed to the feed-spindle 16, extending transversely of the carriage and carrying the escapement-wheel 17. The wheel 17 is alternately engaged by the escapement-dogs 18, one of which is shown in Fig. 2. The escapement, including the ratchet escapement-wheel 17 and the dogs 18, is operated from the keys in a manner well understood in the art, and it is thought to be unnecessary to describe the operating connection further than to say that it includes a swinging key-yoke 19, mounted within the casing and arranged to be engaged and swung by any one of the several pins 20, which extend from the stems of the numeral-keys, as shown in Fig. 2. By this means the depression of a key to print a digit will cause the shifting of the escapement-dogs, and when the key is released the dogs will be permitted to shift back to their normal positions, and the carriage will simultaneously advance the distance of one letter space to the right.

*The relation of the computing device to the type-writing machine.*—In rear of the machine-frame 1 a guide-bar 21 is supported in parallelism therewith by brackets 22. On the bar 21 is slidably supported a computing device or register 23, designed to be shifted along the bar and secured in position for use with respect to a column located at any point on the work-sheet supported by the platen. The device 23 includes a casing which contains the computing and registering mechanism, the specific character of which constitutes no part of the present invention. Suffice it to say that it includes, as usual, a series of denominational members, digit-carriers, or number-wheels designed to register hundredths, tenths, units, tens, hundreds, thousands, ten thousands, hundred thousands, and millions, the tenths-wheel being of double width to accommodate the decimal-space. Each of these wheels is provided upon its periphery with the digits "0" to "9," inclusive, preferably formed in or upon the end faces of the peripheral teeth, one digit of each wheel being observable through a sight-opening 24 at the upper front corner of the casing. Each digit-carrier or number-wheel is arranged to make nine-tenths of a complete rotation independently of the other wheels of the series to present its digits successively before the sight-opening and during its next or tenth increment of movement carries the next wheel to the left a single increment or step, after which the first-named wheel may again rotate independently for nine-tenths of a complete rotation before again advancing the adjacent wheel at the left a single step. Since the wheels of the entire series are related to one another in the manner stated, it follows that mechanical computations in addition may be effected by moving the wheels corresponding in order or denomination to the order of the digits composing the numbers to be added a number of increments corresponding to the unitary values of such digits. Thus suppose it is desired to add "23" and "32." The ciphers of all the wheels being disposed opposite the sight-opening, the tens-wheel will be moved two increments, presenting the digit "2" to view. The units-wheel will then be rotated three increments, and the number "23" will be observable through the sight-opening. The second number "32" will now be added by imparting to the tens-wheel three additional increments of movement and to the units-wheel two additional increments, thus causing the numerals presented before the sight-opening to read "55," the sum of the two numbers. Since the numerical value of each order or denomination of the column is ten and since each wheel during its last or tenth increment of movement will, as heretofore explained, impart a single increment of movement to the next adjacent wheel of higher order, it follows that when the number reaches the limit of the numerical value of a given order or denomination the rotation of the adjacent wheel to the left will effect the registration of a digit of the next higher order. For instance, assuming the first order or units wheel to be given nine increments of movement during the presentation of the digit "9" opposite the sight-opening, the next or tenth increment of movement will present the "0" on said wheel before the sight-opening and will simultaneously advance the next higher or tens wheel a single increment to present the digit "1" of the second order or denomination before the opening, the presentation of the two digits "0" and "1" in the first and second orders effecting the registration of the number 10.

*The master-wheel and its operating connections.*—Upon the carriage 4 of the type-writing machine is mounted that portion of the computing mechanism which constitutes the operating means for the computing device proper, which, as we have seen, is mounted on the machine-frame. The primary element of this actuating mechanism is a master-wheel 25, presentable to the several wheels of the computing device in succession by the step-by-step advance of the carriage in the direction of letter-spacing. The master-wheel is designed to rotate the computing-wheels in proportion to the numerical value of the digits embraced by the computation. The master-wheel is key-operated, and the operating-keys in the illustrated embodiment of the invention are the numeral-keys of the type-writer, although it is obvious that, viewing the invention as a calculating-machine, regardless of the recording of the digits upon a work sheet or page it is immaterial whether the keys perform any function other than the actuation of the master-wheel.

By reference more particularly to Figs. 2, 3, 5, and 17, it will be observed that the master-wheel 25 is rigidly mounted upon a short shaft 26, journaled at the rear side of what may be termed the "actuator-frame" 27, mounted in any suitable manner upon the removable top or cover $5^\times$ of the carriage-casing 5. From one side of the master-wheel extends a toothed clutch-flange 28, formed with ratchet-teeth arranged to be engaged by what may be termed the "master-wheel" clutch 29, slidably and rotatably mounted on the actuator-shaft 26 and designed to effect an operative connection between the master-wheel 25 and an operating pinion 30. The pinion 30 is preferably integral with one end of what I shall term a "stop-shaft" 31, to be more fully described hereinafter. The shaft 31 is alined with the shaft 26 and is likewise journaled in the actuator-frame 27, the pinion 30 preferably having a central bore $30^a$, within which one end of the shaft 26 is received and supported. By reason of this mounting of the shafts 26 and 31 they are capable of independent rotary movement. The master-wheel clutch 29 is constantly urged toward its engaging position by springs 32, suitably interposed between the pinion 30 and the clutch. In order that the connection between the pinion and the clutch may be maintained regardless of the movement of the clutch into and out of engagement with the master-wheel, the pinion is formed with openings 33 for the reception of projections 34, extending from the clutch. (See Fig. 5.) It will now be apparent that when the pinion is rotated in one direction an engagement with the master-wheel will be effected by the clutch 29, while the reverse rotation of the pinion will be independent of the master-wheel for the reason that the inclined faces of the teeth on the clutch will ride upon the inclined faces of the teeth formed on the flange 28, thus urging the clutch 29 laterally against the resistance of the springs 32 and permitting the rotation of the clutch with the pinion and independently of the master-wheel. The operating connection between the numeral-keys and the actuator-pinion 30 includes an actuating-lever 35, (see Fig. 12,) mounted on a short shaft 36 in the actuator-frame and provided with a retracting-spring 37, encircling the shaft and tending to move the lever to its retracted position. The lever 35 is fulcrumed adjacent to its front end and is formed at its opposite extremities with toothed segments 38 and 39, the former meshing with the pinion 30 and the latter with a toothed segment or rack 40, carried at the extremity of a rack-arm 41, projecting through the plate 5× from a rock-shaft 42. The shaft 42 is mounted in bearing-brackets 43, pendent from the removable cover-plate 5× of the carriage-casing. This rock-shaft 42 constitutes a motion-transmitting element mounted within the carriage-casing and common to all of the numeral-keys—that is to say, the numeral-keys are each designed to impart a different degree of movement to the rock-shaft 42 for the purpose of transmitting through the latter and its intermediate connections such movement to the master-wheel as will serve to advance a digit-carrier or number-wheel a number of increments corresponding to the unitary value of the key depressed. The operating connections between the keys and the rock-shaft include a series of loose arms 44, extending laterally from the shaft 42 and having angular ends 45 disposed for engagement by the key stems or projections 20. (See Figs. 2 and 12.) Adjacent to each loose arm 44 the shaft 42 is equipped with a comparatively short fixed arm 46, provided with a lateral projection 47, disposed under the adjacent loose arm, so that when the latter is swung down by the depression of a key it will engage the fixed arm, and thus swing the latter and effect a partial rotation of the shaft 42. Normally all of the key-stem pins 20 are in engagement with the top of the carriage-casing, as shown in Fig. 12, thereby serving to limit the upward movement of the keys. Since the strokes of the several keys are of uniform length and since these keys necessarily each impart a different degree of movement to the shaft 42 in correspondence with the values of the several digits, provision is made for more or less lost movement of the keys. To this end the fixed arms 46 are disposed in graduated arrangement (see Fig. 4) to dispose the projections 47 thereof in different horizontal planes. Thus the arm 46 at the extreme left-hand end of the series will be disposed at a sufficient distance below the pin 20 of the "1" key to permit independent movement of said key during eight-ninths of its stroke, after which the adjacent loose arm 44 contacts with the fixed arm and swings it to rock the shaft 42. This movement of the rock-shaft is sufficient to effect one increment of movement of the master-wheel and a similar movement of the computing-wheel in mesh therewith, it being obvious that when the shaft 42 is rocked by a key in the manner described the arm 41 will swing, thus oscillating the lever 25 and causing the rack 38 thereon to rotate the pinion 30, and with it the master-wheel, which in turn rotates a wheel of the computing device. The several arms 46 to the right of the one whose operation has just been described are located progressively in higher planes, so that the movement of said arms, and consequently the movement of the rock-shaft and the operating connections between it and the master-wheel, will be increased in accordance with the increase in numerical value of the keys. The restoration of the rock-shaft 42 to its normal position when the key depressed is permitted to rise is effected by a retracting-spring 48. (See Fig. 4.)

*The means for preventing reverse rotation of the master-wheel and for preventing the retraction of the master-wheel-operating connections when a key rises from an incomplete stroke.*—Fixed to one side of the master-wheel 25 is a ratchet-wheel 49, (see Fig. 7,) engaged by a locator 50, which tends to compel the accurate location of the master-wheel when the latter comes to rest, so that the teeth of said wheel will move with certainty and precision between the teeth of the number-wheels as the carriage advances. In addition to the locator 50 the ratchet 49 is engaged by an arm 51, extending upwardly from a locking-lever 52, fulcrumed, as at 53ª, upon a suitable bracket within the actuator-frame, but adjacent to one side thereof. Normally the arm 51 engages a tooth of the ratchet 49 in a manner to prevent reverse rotation thereof and of the master-wheel. The locking-lever 52 is formed with a locking end 53 and a trip-arm 54, extending in opposite directions from its rear extremity, and at its front end is formed with a point 55, engaged by a spring-urged detent 56, which serves to yieldingly retain the lever 52 at either limit of its movement. Normally the locking-lever 52 assumes the position indicated in full lines in Fig. 7; but as soon as the master-wheel begins to move upon the depression of a key that tooth of the ratchet 49 which lies under the end of the arm 51 effects the elevation of the arm and incidentally swings the lever 52 to the position indicated in dotted lines in Fig. 7. This movement of the locking-lever presents the locking end 53 thereof behind the master-wheel clutch (see dotted position, Fig. 13) for the purpose of preventing said clutch from moving out of engagement with the master-wheel.

Since the master-wheel is dogged against reverse movement by the locator 50 and since the master-wheel clutch is held in engagement with the master-wheel by the locking-lever, it follows that the actuator-pinion 30, connected to the clutch, will be held against reverse rotation, thus preventing the retraction of the actuating-lever 35 or any other element of the operating connection between the pinion and the key-stem. The retraction of the operating connections is designed to take place as the master-wheel moves from one number-wheel to the next. Therefore the trip-arm 54 of the trip-lever 52 is formed with a tooth 57, disposed to engage a series of fixed trips 58 at the front end of the computing device 23. (See Fig. 2.) This specific arrangement for operating the locking-lever constitutes no part of the present invention, and it is therefore deemed to be unnecessary to do more than remark in this connection that as the carriage advances to shift the master-wheel from one digit-carrier to the next carrier of lower order the tooth 57 will engage one of the trips 58, which will cause the trip-arm 54 to be swung back, the locking end 53 to be withdrawn from behind the clutch 29, and the arm 51 to be brought back into engagement with the ratchet 49. In other words, the movement of the master-wheel under the impulse of a key effects the movement of the locking-lever 52 from the position shown in full lines in Fig. 7 to the dotted-line position in said figure, and the operating connections are thus locked against retraction, but are released during the movement of the carriage, since the lever 52 is restored to the full-line position in Fig. 7 by one of the trips 58. When the locking-lever is thus restored to normal position, the clutch 29 is permitted to move back out of engagement with the master-wheel and the operating connections will be instantly retracted.

*The means for preventing overrunning of the master-wheel.*—We will now describe what is perhaps the most important feature of the present invention—to wit, a novel arrangement, including stop mechanism, whereby the master-wheel will be arrested with certainty and precision when it has completed a movement corresponding in extent to the value of the key depressed. This mechanism embraces a series of alined stops, each of which is appropriate to and designed to be moved to its operative position by one of the keys. Designed to coöperate with these key-operated stops is a second series of stops disposed in a spirally-arranged series and movable in one direction with the master-wheel. When the master-wheel is operated by a given key, a stop appropriate to that key is moved thereby into position to be engaged by the appropriate stop of the spiral series to arrest the master-wheel at the proper point.

The shaft 31, to which, as we have already seen, the actuator-pinion 30 is fixed, is equipped with a spirally-arranged series of stops $1^a$, $2^a$, $3^a$, $4^a$, $5^a$, $6^a$, $7^a$, $8^a$, and $9^a$. (See Figs. 2, 5, 10, and 11.) Since the several stop members of the spiral series are rigidly connected and, in fact, are preferably integral, I shall refer to them in the aggregate as a "spiral" stop member $31^a$. This spiral stop member necessarily rotates with the master-wheel when the latter is operated by the depression of a key and is designed to coöperate with any one of an alined series of stops $1^b$, $2^b$, $3^b$, $4^b$, $5^b$, $6^b$, $7^b$, $8^b$, and $9^b$ in the form of plates disposed side by side within the actuator-frame. (See Figs. 5, 10, and 11.) Each stop-plate is held in its normal position by a spring 59, secured at one end to the plate and at its opposite end to a transverse member 60, to which all of the several springs are connected. The springs are preferably disposed in staggered arrangement, as shown, in order to accommodate them within a small compass. The front ends of the several plates normally abut against the under side of a bar 61, and the several plates are guided in their movements by thin fins 62, pendent from the front ends of the plates and received within the slots of a guide-bar 63. (See Figs. 5 and 10.) Normally, as shown in Fig. 10, the stop-plates are retained in retracted position—that is to say, with their front ends withdrawn from interfering relation with the spirally-arranged stops $1^a$ $2^a$, &c. It is designed, however, to provide means whereby each of these stops will be operatively related to one of the keys in a manner to cause the projection of the stop into the path of movement of one of the stops moving with the master-wheel, it being understood that each stop of the alined series is disposed opposite one of the stops in the spiral series, so that its projection to its operative position, as shown in dotted lines in Fig. 10, will dispose it in position to be engaged by the appropriate stop of the spiral stop member according to the value of the particular key depressed.

The means for throwing the stop-plates—to wit, the stops of the alined series—into operative position includes a series of bell-crank levers 64, mounted on the shaft 65, as shown in Fig. 10. The vertical arm of each lever 64 is pivotally connected, as indicated at $65^a$, with one of the stop-plates, while the horizontal arm 66 of each bell-crank lever is disposed over and arranged to be operated by the inner arm 67 of one of a series of rock-shafts $1^c$, $2^c$, $3^c$, $4^c$, $5^c$, $6^c$, $7^c$, $8^c$, or $9^c$. The several rock-shafts $1^c$ $2^c$, &c., are mounted in suitable bearings 68, secured to the cover-plate $5^x$, and are provided at their outer ends with arms 69, disposed over and arranged to be elevated by cam-arms 70, extended upwardly through the plate $5^x$. The cam-arms 70 swing from the shaft 42 and are preferably formed integral with the several loose arms 44, mounted thereon.

We have already seen that each of the several arms 44 is afforded an operative connection with one of the several numeral-keys, and it will now be apparent that when any numeral-key is depressed it will cause a loose arm 44 to swing down and a cam-arm 70 to swing up. This movement of the arm 70 will rock one of the shafts $1^c$ $2^c$, &c., and the elevation of the arm 67 at the inner end of said shaft will cause the rocking of one of the bell-crank levers 64, which will in turn project one of the stop-plates $1^b$ $2^b$, &c., to the position shown in dotted lines in Fig. 10. Thus one of the alined series of stops will be set in its operative position by the initial movement of a key and will be disposed to be engaged by and to arrest one of the stops of the spiral series when the master-wheel has completed a movement corresponding in extent to the value of the particular key depressed.

As has been explained heretofore, the downward movement of the arm 44 not only effects the setting of a stop in the manner just described, but also serves, either during or after the setting of the stop, according to which key is considered, to depress one of the fixed arms 46, and thus effect the rotation of the master-wheel through the intermediate connections. As the master-wheel rotates the spiral stop member $31^a$ will rotate therewith. This movement will be continued until that one of the spiral stops which corresponds in position with the particular key depressed engages that one of the alined series of stops which has been projected to its operative position. The front end of the stop-plate thus engaged will be thrown down until arrested by the guide-bar 63, as shown in Fig. 11. When this occurs, further movement of the shaft 31 will be prevented, and as a consequence the master-wheel will be stopped with certainty and precision when it has completed its proper movement. The depression of the key having recorded and registered a digit, said key will rise to its normal position upon the removal of the operator's finger therefrom, and as the carriage will advance during such retraction of the key the operating connections will be released by the trip of the locking-lever 52. When released, the operating connections will be retracted in a manner heretofore explained, and as these connections include the actuator-pinion 30, which is rigid with the shaft 31, the latter will rotate back to its normal position and with it will move the spiral stop member. This reverse movement of the stop member will serve to release the stop-plate previously engaged by it, and the latter will be retracted to its normal position by its spring 59.

The retraction of the several loose arms 44 and cam-arms 70 to their normal positions is effected by retracting-springs 71, secured to the arms 70 and to the under side of the cover-plate $5^\times$.

The action of the stop mechanism just described is augmented by the provision of a check-arm 72, having a beak 73 designed to be moved into engagement with a tooth of the master-wheel 25 just as the latter reaches the limit of its proper movement. The check-arm 72 is extended laterally from a check bar or shaft 74, (see Fig. 7,) journaled in the actuator-frame, as shown in Fig. 5. In addition to the check-arm 72 the check-bar 74 is equipped with a laterally-disposed plate 75, designed to be engaged and depressed by any one of a series of depressing-arms 76, extending upwardly from each of the stop-plates $1^b$ $2^b$, &c., and each having an angular upper end 77 extended over the adjacent edge of the plate 75. When any one of the several stop-plates is set by a key, the upper end 77 of its depressing-arm is brought into engagement with the plate 75. (See the dotted-line position in Fig. 10.) When therefore the front end of the stop-plate is swung down by the spiral stop member to the position shown in Fig. 11, the plate 75 will be swung down or depressed by the arm 76. This movement of the plate will cause the check-bar 74 to rock, and the check-arm 72 will thus be swung from the full-line position in Fig. 7 to engage and check the further movement of the master-wheel, as shown in dotted lines in said figure.

To prevent premature movement of the check-arm 72, the check-bar is provided with a pointed projection 78, engaged by a swinging detent 79, urged to its engaging position by a spring 80 and having a projection 81, over which the projection 79 is designed to ride when the check-bar 74 is rotated. The detent 79 thus serves to yieldingly retain the check-bar and its associated parts in either of two extreme positions. The return of the check-bar to normal position after it has been rocked to throw down the check-arm is effected by the actuating-lever 35, equipped with a lateral projection or stud 82, which when the lever is retracted engages and elevates an arm 83, projecting from the check-bar. (See Fig. 12.) By reason of this arrangement the check-arm when operated to engage the master-wheel remains in its engaged positions until the operating connections are released during the advance of the carriage to the right. As soon, however, as these connections are thus released the upward movement of the lever 35 will effect the elevation of the arm 83, thus rocking the check-bar back to its normal position and incidentally withdrawing the check-arm from the wheel and restoring the plate 75 to the position shown in Fig. 10.

*The check-slide for preventing accidental*

*carrying when the operated wheel of the computing device is brought to rest in the "9" position.*—In some forms of computing devices which are capable of use in connection with the operating mechanism herein described the arrest of the operated wheel in the "9" position sometimes results in accidentally advancing the next adjacent wheel of higher order. To prevent this, a check-slide 84 is mounted adjacent to one side of the master-wheel and is connected to the lower end of an arm 86, depending from the check-bar 74. When the check-bar is rotated to move the check-arm into engagement with the master-wheel, it swings the arm 86, which projects the slide 84 to the position indicated in Fig. 11. When the slide 84 is thus projected, its front end extends over a tooth of the number-wheel of next higher order than the one engaged by the master-wheel, and thus prevents accidental carrying movement in case the operated wheel is brought to rest at the "9" position.

*The means for disconnecting the operating connections of the computing device from the numeral-keys to permit the unrestricted use of the type-writer—as, for instance, to facilitate the printing of totals.*—In order to avoid burdening the keys with the master-wheel-operating connections when printing outside of the column being totalized and in order, furthermore, that the total may be printed at the foot of the column without operating the computing device, provision is made whereby the depression of a total-key will move the several fixed arms 46 to inoperative positions—that is to say, to positions sufficiently depressed to prevent said arms from being moved when the numeral-keys are operated To this end a total key or lever 87 (see Fig. 9) is fulcrumed upon a bracket 88, secured to the plate 5ˣ, adjacent to one end thereof. The short end of the lever 87 is extended under the curved upper end of the cam-arm 70, which is operated by the "9" key, the relation of the parts being such that when the rear end of the lever is depressed to the position indicated in dotted lines in Fig. 9 the cam-arm 70, engaged by the lever, will be swung forward, thus depressing the loose arm 44, which, in the case of the "9" key, is normally in engagement with the fixed arm 46. Thus the depression of the total key or lever will cause said fixed arm to swing down, and thus rock the shaft 42 to present the several fixed arms 46 in inoperative positions. Therefore if any of the keys are subsequently depressed to print digits, either within or outside of the column being totalized no movement will be imparted to the master-wheel, and the total or any other matter may therefore be recorded without effecting the operation of the computing device. The lever 87 is yieldingly retained at its opposite limits of movement by a detent in the form of a spiral spring 89, secured to the bracket 88 and lever 87 at opposite sides of the fulcrum of the lever, so that the medial line of the spring will be below the fulcrum of the lever in one position and above the fulcrum in the other position thereof.

*The means for automatically restoring the operative connection between the numeral-keys and the master-wheel subsequent to the printing of the total.*—Upon the back wall of the carriage-casing 5 is fulcrumed a total-key-retracting lever 90, one end of which projects slightly above the top of the casing, as shown in Fig. 5, and is depressed by the total-key or lever 87 when the latter is thrown down to the dotted position in Fig. 9. The depression of one end of the lever 90 by the total-key in the manner stated causes a corresponding elevation of the opposite end of the lever, which is provided with a pivoted arm 91, the movement of which in opposite directions is limited by stops 92 and 93. (See Fig. 5.) The arm 91 is normally retained in the position indicated in Fig. 5 by a spring 94.

Disposed to coöperate with the arm 91 is what may be termed a "total-key" trip 95, (see Fig. 8,) depending from the under side of the computing device 23. As the carriage advances to the right with the total-key depressed the engagement of the arm 91 with the trip 95 will fail to effect any movement of the lever 90, since the arm 91 will merely yield against the resistance of the spring 94, and thus pass idly under the trip 95. When, however, the total has been printed and the carriage is retracted to record a new number or to begin a new line of writing, the arm 91 will engage the trip 95 and being prevented from yielding by the stop 92 will cause the depression of one end of the lever 90, thus elevating the opposite end thereof and restoring the total-key to its normal position. It will be observed that it is only necessary to move the lever 90 a sufficient distance to move the total-key until its spring moves above the axis of its fulcrum, after which the spring 87, as well as one of the springs 71, will assist in restoring the total-key to normal position. When the total-key is thus restored, the several fixed arms 46, together with the rock-shaft and associated parts, will swing back for the purpose of again establishing an operative connection between the keys and the master-wheel.

It is thought that the foregoing description is sufficient for the purposes of this disclosure. It is evident, however, that various features of the invention may be embodied in structures other than those illustrated, and the right to effect such changes, modifications, and variations as may come within the scope of the protection prayed is therefore expressly reserved.

What we claim is—

1. In a calculating-machine, a computing device having denominational members, a series of keys arranged to cause the operation of either of said members independently of those of lower order, a graduated series of stops movable with the member operated, a second series of stops normally out of coöperative relation with the stops of the first series, and means whereby when a key is moved to cause the operation of a denominational member of the computing device and the stops of the first series, a stop of the second series will be moved into interfering relation with a stop of the first series to arrest the movement of the denominational member at the proper point.

2. In a calculating-machine, a computing device having a series of denominational members, a master means arranged to operate said members in succession, a graduated series of stops movable with the master means, a series of keys each of which is arranged to move the master means and the graduated series of stops, and a second series of stops each operatively connected with one of the keys and arranged to be moved into interfering relation with one of the stops of the graduated series when a key is depressed, whereby the movement of the denominational member will be arrested at the proper point by the interference of the stops.

3. In a calculating-machine, a computing device including a series of denominational members, a key-operated master-actuator arranged to operate either of said members independently of those of lower order, and means including a spiral stop for arresting the movement of the actuator and the denominational member operated thereby.

4. In a calculating-machine, a computing device including a series of denominational members, a master-wheel arranged to directly engage and operate each of said members independently of those of lower order, a spiral stop member rotatable with the wheel, and means coöperating with said member and arranged to engage and arrest the movement of the wheel at the proper point.

5. In a calculating-machine, a computing device including a series of denominational members, actuating mechanism therefor arranged to directly engage and actuate each of said members independently of those of lower order, a graduated series of stops movable with the actuating mechanism, and means coöperating with said stops to arrest the actuating mechanism at different points.

6. In a calculating-machine, a computing device including a series of denominational members, keys each arranged to operate each of said members independently of those of lower order, and a key-operated spiral stop member arranged to arrest the movement of a denominational member.

7. In a calculating-machine, a computing device including a series of denominational members, an actuator arranged to operate successive members, a plurality of keys, and two key-operated series of stops coöperating to arrest the movement of a denominational member.

8. In a calculating-machine, a computing device including a series of denominational members, actuating mechanism arranged to actuate any member independently of those of lower order, a plurality of keys, and two series of key-operated stops, the stops of one series being normally alined and the stops of the other series having graduated arrangement, the stops of said series being disposed to coöperate to limit the operation of the computing device.

9. In a calculating-machine, a computing device including a series of denominational members, keys arranged to operate any member independently of those of lower order, and means for preventing overthrow of the computing device, said means including two series of coöperating stops, one of said series of stops having a spiral arrangement.

10. In a calculating-machine, a computing device having denominational members, an actuator arranged to operate successive members, a stop member movable with the actuator and having a spirally-arranged series of stops, and a second series of stops disposed to coöperate with the spirally-arranged series of stops to arrest the movement of a denominational member.

11. In a calculating-machine, a computing device having denominational members, actuating mechanism arranged to actuate either denominational member independently of those of lower order, and two series of coöperating stops for the actuating mechanism, one series of stops being movable in unison and the stops of the other series being independently movable into operative position to arrest the movement of the actuating mechanism after a given operation of the computing device.

12. In a calculating-machine, a computing device including a series of denominational members, a series of keys arranged to operate any member independently of those of lower order, and stop mechanism including a spirally-arranged key-operated series of stops movable in unison and a second series of stops each of which is independently movable into operative relation with a stop of the spiral series to arrest the movement of a denominational member.

13. In a calculating-machine, a computing device including a series of denominational members, a master-wheel movable to engage and operate successive members, a spirally-arranged series of stops movable with the master-wheel, and a normally alined series of stops each of which is independently movable into coöperative relation with a stop of the other series to arrest the movement of a denominational member.

14. In a calculating-machine, a computing device including a series of denominational members, keys for moving each of said members independently of those of lower order, and stop mechanism for said computing device including a plurality of stops arranged to be operated by the keys to arrest the movement of the denominational members.

15. In a calculating-machine, a computing device including a series of denominational members, keys for moving either of said members independently of those of lower order, stop mechanism including a series of stops each of which is operatively related to a key to be moved to its operating position when the key is moved to operate the computing device, and means arranged to engage the stops so positioned to arrest the movement of a denominational member.

16. In a computing-machine, a computing device including a series of denominational members, keys arranged to operate either of said members independently of those of lower order, and stop mechanism including a spirally-arranged series of stops arranged to be moved by the keys and to arrest the movement of the denominational members.

17. In a calculating-machine, a computing device including a series of denominational members, keys arranged to operate either of said members independently of those of lower order, and stop mechanism including two series of stops, the stops of one series being movable in unison by the keys and having graduated arrangement and the stops of the other series being independently movable to their operative positions by the keys to cause the movement of the denominational members to be arrested at the proper time.

18. In a calculating-machine, a computing device including a series of denominational members, a master-wheel arranged to directly engage and operate successive members, a graduated series of stops movable with the master-wheel, a second series of stops independently movable into position to coöperate with the stops of the first-named series to cause the movement of the master-wheel to be arrested at the proper point, and keys arranged to operate the master-wheel and to move the stops of the second series into operative position.

19. In a calculating-machine, a computing device including a series of denominational members, a master-wheel arranged to engage and operate successive members, a key for operating the master-wheel, a stop movable with the master-wheel, and a second stop normally occupying an inoperative position but arranged to be moved by the initial movement of the key to an interfering position with respect to the stop which is movable with the master-wheel, the interference of the stops serving to cause the arrest of the master-wheel and the denominational member engaged thereby at the proper point.

20. In a calculating-machine, a computing device, a master-wheel therefor, means for operating the master-wheel, and stop mechanism including a spiral stop arranged to rotate with the master-wheel when the latter is moved to operate the computing device and arranged to be retracted to its normal position after each operation of the master-wheel.

21. In a calculating-machine, a computing device, a master-wheel therefor, an actuator-pinion, a clutch for connecting said pinion with the master-wheel to rotate the latter in one direction, means for rotating the pinion, and stop mechanism including a graduated series of stops movable with the pinion.

22. In a calculating-machine, a computing device, a master-wheel therefor, an actuator-pinion, a clutch for connecting said pinion with the master-wheel to rotate the latter in one direction, means for rotating the pinion, and stop mechanism including a spirally-arranged series of stops movable with the pinion.

23. In a calculating-machine, a computing device including a series of denominational members, keys arranged to operate either member independently of those of lower order, stop mechanism including two series of stops coöperative to arrest the movement of the denominational members, and a series of levers each operatively related to a key and to a stop of one series to transmit motion from the key to said stop.

24. In a calculating-machine, a computing device, actuating mechanism therefor including a rock-shaft, a series of arms thereon, keys for swinging the arms, and stop mechanism including two coöperating series of stops, each of the several stops of one series being operatively related to one of the arms on the rock-shaft and arranged to be moved to its operative position by said arm.

25. In a calculating-machine, a computing device including a series of denominational members, operating mechanism for transmitting motion to either of said members independently of those of lower order, and stop mechanism including a series of independently-movable stops arranged to be positioned by the operating mechanism of the computing device and to thereafter cause the movement of a denominational member to be arrested at the proper point.

26. In a calculating-machine, a computing device including a series of denominational members, means for transmitting motion to either member independently of those of lower order, and stop mechanism including a series of independently-movable stops and a series of rock-shafts each connected to a stop to move the same and arranged to be operated by the motion-transmitting means 27. In a calculating-machine, a computing device including a series of denominational members, keys for moving either of said members independently of those of lower order, and stop mechanism including a series of independently-movable stops each of which is disposed for actuation by one of the keys to present the stop in position to cause the arrest of a denominational member.

28. In a calculating-machine, a computing device including a series of denominational members, keys for moving either of said members independently of those of lower order, stop mechanism including a series of independently-movable stops, and a series of rock-shafts each disposed to be operated by a key to move one of the stops to its operative position.

29. In a calculating-machine, a computing device including a series of denominational members, keys for moving either of said members independently of those of lower order, stop mechanism including a series of independently-movable stops, a series of levers arranged to move said stops to their operative positions, and a series of rock-shafts for moving said levers, each of said rock-shafts being operatively related to a key.

30. In a calculating-machine, a computing device, an actuator therefor, a rock-shaft, operating connections between the rock-shaft and the actuator, a series of cam-arms extending from the rock-shaft, keys each arranged to rock said shaft and to move a cam-arm, a series of rock-shafts each of which is moved by one of the cam-arms, a series of bell-crank levers each arranged to be swung by one of the rock-shafts last named, and stop mechanism including a series of independently-movable stops each arranged to be moved by one of the bell-crank levers.

31. In a calculating-machine, a computing device, a master-wheel therefor, a check-arm for the master-wheel, a plurality of coöperating stops, and means operated by one of the stops for moving the check-arm to its engaging position.

32. In a calculating-machine, a computing device, a master-wheel therefor and a check-arm for the master-wheel, stop mechanism including a series of independently-movable stops, and means arranged to be operated by either of said stops to move the check-arm to its engaging position.

33. In a calculating-machine, a computing device, a master-wheel therefor, a check-arm for the master-wheel, two series of coöperating stops, and means operated by certain of said stops for moving the check-arm to its engaging position.

34. In a calculating-machine, a computing device, a master-wheel therefor, a check-arm for the master-wheel, a series of stops movable with the master-wheel, a second series of stops each of which is movable into interfering relation with a stop of the first series and each of which is capable of further movement after being engaged by a stop of the first series, and means arranged to be operated by either stop of the second series during the final movement thereof to move the check-arm to its engaging position.

35. In a calculating-machine, a computing device, a master-wheel therefor, a check-bar, a check-arm carried by the bar and disposed to engage the master-wheel, and two series of coöperating stops, certain of said stops being disposed to rock the check-bar to throw the check-arm to its engaging position.

36. In a calculating-machine, a computing device, a master-wheel therefor, a check-bar, a check-arm carried by the bar and movable to engage the master-wheel, a plate extended laterally from the check-bar and stop mechanism including two series of coöperating stops, the stops of one series being provided with depressing-arms disposed to engage and move the plate and to thus rock the check-bar and move the check-arm to its engaging position.

37. In a calculating-machine, a computing device, a master-wheel therefor, a check-arm movable to engage the master-wheel, a spirally-arranged series of stops movable with the master-wheel, an alined series of stops each movable into interfering relation with one of the stops of the spiral series and also having limited movement after being engaged by said stop, and means whereby the final movement of any one of the alined series of stops will effect the movement of the check-arm to its engaging position.

38. In a calculating-machine, a computing device, a master-wheel, a check-arm disposed to engage the master-wheel, means for yieldingly retaining the check-arm in its engaged position, mechanism movable to operate the master-wheel and arranged to be retracted independently thereof, and means whereby said mechanism when retracted will positively move the check-arm out of engagement with the master-wheel.

39. In a calculating-machine, a computing device, a master-wheel therefor, a check-arm for the master-wheel, an actuating member arranged to rotate the master-wheel, means for moving the check-arm to engage the wheel, and means operated by the actuating member for moving the check-arm to its disengaged position.

40. In a calculating-machine, a computing device, a master-wheel, a check-bar having a check-arm disposed to engage the master-wheel, an actuating-lever for the master-wheel, a second arm extending from the check-bar, and a projection extending from the actuating-lever and arranged during the retraction of said lever to strike and swing the last-named arm for the purpose of rocking the check-bar to withdraw the check-arm from the master-wheel.

41. In a calculating-machine, a computing device, including a series of number-wheels, actuating mechanism therefor, stop mechanism including a series of stops, and a check-slide arranged to be moved by any of said stops to engage a wheel of the computing device.

42. In a calculating-machine, a computing device including a series of number-wheels, a master-wheel therefor, a check-bar having a check-arm disposed to engage the master-wheel, and a check-slide arranged to be moved by the check-bar to engage one of the wheels of the computing device.

43. In a calculating-machine, a computing device, a master-wheel, a check-slide for the computing device, and a rotary check-bar arranged to operate both the check-arm and the check-slide.

44. In a calculating-machine, a computing device and actuating mechanism therefor, having relative lateral movement, recording mechanism operatively connected with the actuating mechanism of the computing device, means for disconnecting said actuating mechanism from the recording mechanism to permit the printing of the total while the actuating mechanism is in engagement with the computing device, without effecting the operation of said device, and means for automatically restoring the connection between the actuating mechanism and the recording mechanism.

45. In a calculating-machine, a computing device, actuating mechanism therefor, printing mechanism normally connected with the actuating mechanism, a carriage movable laterally with respect to the computing device to effect relative movement of the computing device and its actuating mechanism, means for disconnecting the printing mechanism from the actuating mechanism to permit the printing of totals while the actuating mechanism is in engagement with the computing device, and means brought into action upon the retraction of the carriage to restore the connection between the printing mechanism and the actuating mechanism of the computing device.

46. In a calculating-machine, a computing device, actuating mechanism therefor, printing mechanism connected to the actuating mechanism, a carriage movable laterally with relation to the computing device to effect relative movement of said device and its actuating mechanism, a total-key arranged to disconnect the printing mechanism from the actuating mechanism to permit the printing of totals, and means including a trip brought into action during the retraction of the carriage to restore the total-key to its normal position.

47. In a calculating-machine, a computing device, actuating mechanism therefor, printing mechanism connected to the actuating mechanism, a traveling carriage, a total-key for disconnecting the printing mechanism from the actuating mechanism to permit the printing of totals while the actuating mechanism is in engagement with the computing device, a total-key-retracting mechanism including a lever and a trip, one of said elements being movable with the carriage and presentable to the other to effect the retraction of the total-key.

48. In a calculating-machine, a computing device, a traveling carriage, actuating mechanism for the computing device mounted on the carriage, printing mechanism connected with the actuating mechanism, a total-key for disconnecting the printing mechanism from the actuating mechanism, a lever movable with the carriage, and a trip mounted independently of the carriage and arranged to effect the actuation of the lever to retract the total-key.

49. In a calculating-machine, a computing device, a traveling carriage, actuating mechanism for the computing device, movable with the carriage, printing mechanism also movable with the carriage and connected to the actuating mechanism, a total-key mounted on the carriage and movable to disconnect the printing mechanism from the actuating mechanism, a total-key-retracting lever mounted on the carriage, and a trip associated with the computing device and arranged to operate the lever as the carriage is retracted.

50. In a calculating-machine, a computing device, a traveling carriage, actuating mechanism for the computing device movable with the carriage, printing mechanism also movable with the carriage and connected to the actuating mechanism, a total-key mounted on the carriage and movable to disconnect the printing mechanism from the actuating mechanism, a total-key-retracting lever mounted on the carriage, a trip associated with the computing device and arranged to operate the lever as the carriage is retracted, and means whereby the trip will be prevented from operating the lever during the advance of the carriage in the direction of letter-spacing.

51. The combination with a computing mechanism including a series of denominational members, of a series of keys arranged to transmit motion from the finger of an operator to either member independently of those of lower order, a graduated series of stops arranged to be moved by the keys, and a second series of stops movable independently of each other and each arranged to be moved by a key into position to cause the arrest of the movement of the computing device under the impulse of said key.

In testimony that we claim the foregoing as our own we have hereto affixed our signatures in the presence of two witnesses.

CHARLES FREDERICK LAGANKE.
   JOHN ASBURY SMITH.

Witnesses:
 W. T. McELROY,
 ARTHUR COWDREY.